(12) United States Patent
Robinson et al.

(10) Patent No.: US 6,978,046 B2
(45) Date of Patent: Dec. 20, 2005

(54) SYSTEMS AND METHODS FOR AUTOMATED TEMPLATE CREATION USING SCANNED INPUT

(75) Inventors: David C. Robinson, Penfield, NY (US); Michael E. Farrell, Ontario, NY (US)

(73) Assignee: Xerox Corporation, Stamford, CT (US)

( * ) Notice: Subject to any disclaimer, the term of this patent is extended or adjusted under 35 U.S.C. 154(b) by 694 days.

(21) Appl. No.: 10/063,220

(22) Filed: Mar. 29, 2002

(65) Prior Publication Data

US 2004/0202367 A1 Oct. 14, 2004

(51) Int. Cl.⁷ .............................. G06K 9/62; G06K 9/36
(52) U.S. Cl. ........................................ 382/209; 382/284
(58) Field of Search ................................ 382/161, 162, 382/164, 173, 176, 202, 209, 284, 305, 317, 382/318; 707/3, 503, 506, 510, 515, 517, 707/528, 530; 358/505, 515; 715/517, 522, 715/528

(56) References Cited

U.S. PATENT DOCUMENTS

| | | | | |
|---|---|---|---|---|
| 5,293,429 A | * | 3/1994 | Pizano et al. | 382/202 |
| 5,293,430 A | | 3/1994 | Shiau et al. | 382/173 |
| 5,339,172 A | | 8/1994 | Robinson | 358/462 |
| 5,465,304 A | * | 11/1995 | Cullen et al. | 382/176 |
| 5,594,809 A | * | 1/1997 | Kopec et al. | 382/161 |
| 5,767,978 A | | 6/1998 | Revankar et al. | 358/296 |
| 5,813,018 A | | 9/1998 | Kaji et al. | 715/502 |
| 5,845,302 A | * | 12/1998 | Cyman et al. | 715/517 |
| 5,850,474 A | | 12/1998 | Fan et al. | 382/173 |
| 6,175,427 B1 | | 1/2001 | Lehmbeck et al. | 358/1.9 |
| 6,181,829 B1 | | 1/2001 | Clark et al. | 382/273 |
| 6,636,648 B2 | * | 10/2003 | Loui et al. | 382/284 |
| 6,701,308 B1 | * | 3/2004 | Chen et al. | 707/3 |
| 6,738,517 B2 | * | 5/2004 | Loce et al. | 382/209 |
| 6,779,153 B1 | * | 8/2004 | Kagle | 715/522 |

OTHER PUBLICATIONS

Anil, K. Jain, "Fundamentals of Digital Image Processing", Ch. 9, pp. 342-430, Prentice Hall, Englewood Cliffs, NJ 07632, 1989.

* cited by examiner

Primary Examiner—Andrew W. Johns
Assistant Examiner—Amir Alavi
(74) Attorney, Agent, or Firm—Oliff & Berridge, PLC

(57) ABSTRACT

An automated document template creation method comprises: inputing data of an existing document that contains a visual design to input an image; decomposing the image into at least one object using at least one image processing technique; determining at least one design attribute of the object; and synthesizing a document template containing the design attribute. An automated document template creation system comprises: an input device that receives data of an existing document containing a representative visual design to obtain an image; an image processor that decomposes the image into at least one object and determines at least one design attribute of the object; and a template creator that synthesizes a document template containing the design attribute. The systems and methods allow a scan/preparation user at a makeready station to generate additional and/or replacement pages for an existing document that are visually coherent with the predetermined visual design of the document.

20 Claims, 2 Drawing Sheets

SYSTEMS AND METHODS FOR AUTOMATED TEMPLATE CREATION USING SCANNED INPUT

BACKGROUND OF INVENTION

1. Field of Invention

This invention relates to template creation from scanned input such as the creation of a document template.

2. Description of Related Art

Production printing such as that of a publisher of mass media or literary works often utilizes what is known as a makeready station. A makeready station allows a user to add value to printing projects by modifying or correcting existing documents or by creating new documents composed of heterogeneous inputs. Examples of added value include the addition of page numbers, the addition of headers and/or footers, the addition of digital watermarks and/or merge items, and merging scanned images with electronic format documents, such as page description language (PDL) pages.

Various products exist with makeready functionality. For example, DocuTech 135 by Xerox includes applications such as Document Scan and MakeReady that enable such functionality.

SUMMARY OF INVENTION

The systems and methods of this invention provide automated creation of a template for a page of an existing document.

The systems and methods of this invention separately provide automated creation of a template for a page of an existing document from a scanned input.

The systems and methods of this invention separately provide a template for generating a page that is visually coherent with the page or pages of an existing document.

According to various exemplary embodiments of this invention, an automated document template creation method comprises: scanning an existing document that contains a visual design to input an image; decomposing the image into at least one object using at least one image processing technique; determining at least one design attribute of the at least one object; and synthesizing a document template containing the at least one design attribute.

In various embodiments, decomposing the image into at least one object comprises using an image segmentation technique. In various embodiments, decomposing the image into at least one object comprises using an image classification technique. In various embodiments, decomposing the image into at least one object comprises using an optical character recognition technique. In various embodiments, decomposing the image into at least one object comprises decomposing the image into at least one of a text region, a pictorial, line art and a color theme.

In various embodiments, determining at least one design attribute of the at least one object comprises using an optical character recognition technique. In various embodiments, determining at least one design attribute of the at least one object comprises determining a page layout. In various embodiments, determining at least one design attribute of the at least one object comprises determining font information.

According to various exemplary embodiments of this invention, an automated document template creation system comprises: a scanner that scans an existing document containing a representative visual design to obtain an image; an image processor that decomposes the image into at least one object and determines at least one design attribute of the at least one object; and a template creator that synthesizes a document template containing the at least one design attribute. In various embodiments, the system further comprises a data storage device that stores the document template.

These and other features and advantages of this invention are described in, or are apparent from, the following detailed description of various exemplary embodiments of the systems and methods according to this invention.

BRIEF DESCRIPTION OF DRAWINGS

Various exemplary embodiments of the systems and methods of this invention described in detail below, with reference to the attached drawing figures, in which.

DETAILED DESCRIPTION

Figure 1:
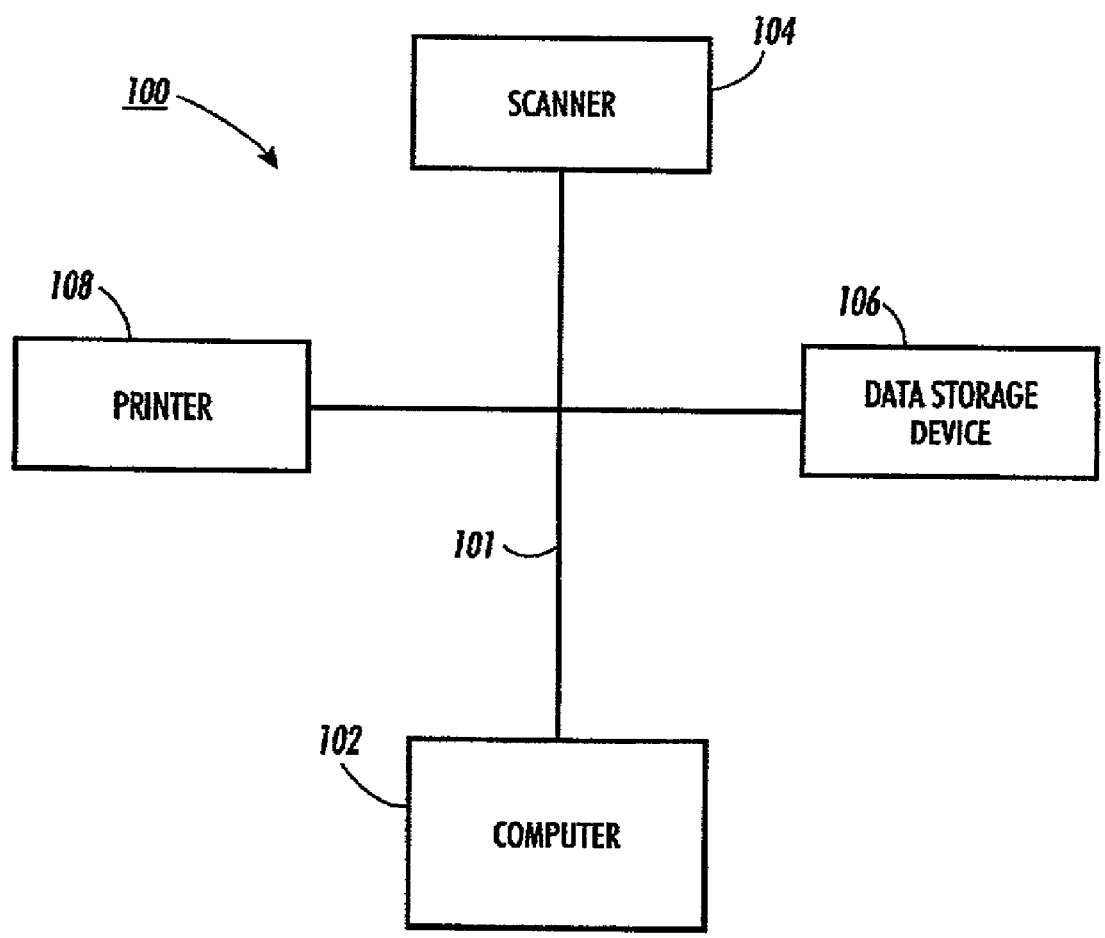
FIG. 1 is a schematic block diagram of a makeready station according to an exemplary embodiment of this invention.

The systems and methods according to this invention allow a user, such as a scan/preparation user in production printing, to add and/or replace pages in an existing document that has a predetermined visual design theme. For example, the visual design theme may comprise text treatments, margins, background colors and the like. Many reasons exist for creating additional pages. For example, the user may add content to the existing document for added value. Also, one or more pages of the existing document may be missing or damaged. For example, physical pages may be lost or damaged during handling of the document and electronic pages may be corrupted during transmission or conversion of the document.

Typically, a document creator uses one or more document templates when creating a document with a particular visual design theme. In production printing, the document templates are not conveyed with the document in the production cycle. Thus, the templates are not available to the scan/preparation user.

Without the templates that were used to create the original document, the scan/preparation user must manually identify each element of the visual design theme and use each element when creating additional or replacement pages for the existing document. Such manual identification and replication of the predetermined visual design theme is labor-intensive and introduces human error.

The systems and methods according to this invention allow the scan/preparation user generate additional and/or replacement pages for an existing document that are visually coherent with the predetermined visual design theme of the document. According to the invention, the creation of additional and/or replacement pages is automated so that manual labor and human errors are reduced. In various embodiments of the invention, the automated page creation is provided by automated creation of a template for a page of the existing document. In various embodiments, the template is created from a scanned input.

In various embodiments according to this invention, one or more pages of the existing document that contain the predetermined visual design theme are scanned. For each scanned page, the scanned image is decomposed using image processing techniques into objects, such as, for example, text regions, zones for page layout, pictorials, line art, background patterns and the like. Attributes of or information about the objects, such as, for example, font type, font size, paragraph spacing, line spacing, justification and the like, are/is acquired using image processing techniques. Further, background color and the like may be determined.

Once the attributes of the objects are identified, a template containing the attributes is synthesized. Once created, the template is saved in any desired template format for use with word processing software or the like. The template can then be used to create additional/replacement pages for the existing document that are visually coherent with the predetermined visual design theme of the document.

In various exemplary embodiments according to this invention, the image may be decomposed into objects using any known or hereafter developed image segmentation techniques. For example, see U.S. Pat. No. 5,293,430 to Shiau et al., U.S. Pat. No. 5,767,978 to Revankar et al., U.S. Pat. No. 5,850,474 to Fan et al., U.S. Pat. No. 6,175,427 to Lehmbeck et al. and U.S. Pat. No. 6,181,829 to Clark et al., each of which is incorporated herein by reference in its entirety. Alternatively or additionally, the image may be decomposed into objects using optical character recognition (OCR) software, such as Textbridge Pro 98 by Scan Soft or Acrobat Capture by Adobe Systems Incorporated. It should be understood that any known or hereafter develop software that is capable of decomposing an image according to this invention may be used.

In various exemplary embodiments, optical character recognition (OCR) techniques may be used, in conjunction with other techniques, to acquire the attributes of or information about the objects, such as font type, font size, paragraph spacing, line spacing, justification and the like. For example, products noted above that convert scanned images into formatted electronic representations of the image typically provide this capability, including optical character recognition (OCR). Further, background color regions may be determined using background detection algorithms within the color extended image processing of Chip Set 95. Similar techniques may also be used to acquire font colors and the like.

FIG. 1 shows a makeready station 100 according to an exemplary embodiment of the invention. As shown in FIG. 1, the makeready station 100 comprises a processor or computer 102, an image capture device or scanner 104, a data storage device 106 and a printer or output device 108. The scanner 104, the data storage device 106 and the printer 108 are in communication with the computer via a communication link 101.

The makeready station 100 can be implemented using a programmed general purpose computer. However, the makeready station 100 can also be implemented using a special purpose computer, a programmed microprocessor or micro-controller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the exemplary flowchart shown in FIG. 2 can be used to implement the makeready station 100.

The communication link 101 shown in FIG. 1 can be any known or later developed device or system for connecting various devices to a computing device such as the computer 102, including a direct cable connection, a connection over a wide area network or a local area network, a connection over an intranet, a connection over the Internet, or a connection over any other distributed processing network or system. In general, the communication link 101 can be any known or later developed connection system or structure usable to connect devices and facilitate communication.

Further, it should be appreciated that the communication link 101 can be a wired or wireless link to a network. The network can be a local area network, a wide area network, an intranet, the Internet, or any other distributed processing and storage network.

It should also be appreciated that the data storage device 106 can be any known or later developed device or system capable of storing electronic information. Further, while the exemplary makeready station 100 is shown with the scanner 104, it should be appreciated that any known or later developed device or system capable of inputing data of an existing document may be used.

Figure 2:
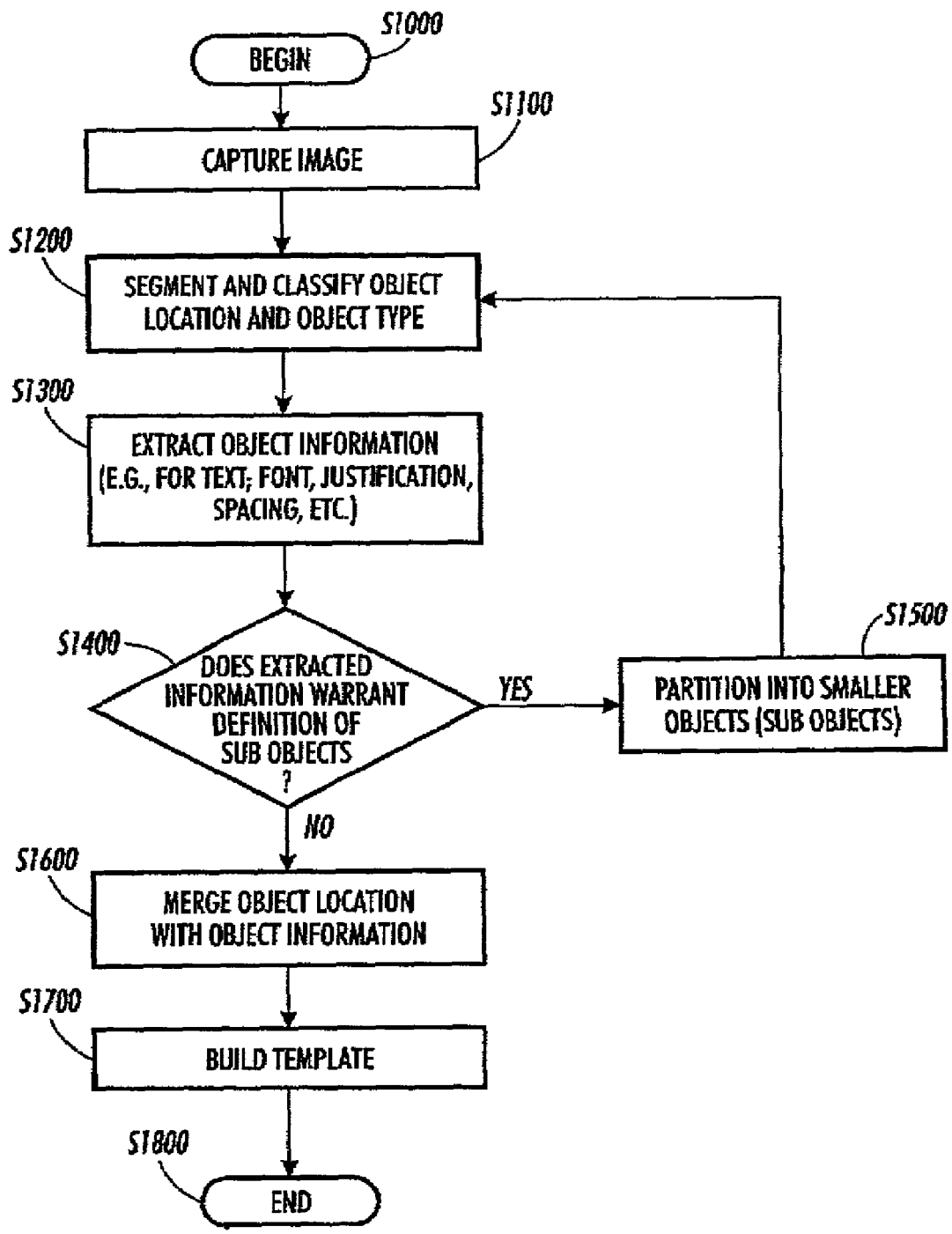
FIG. 2 is an exemplary flowchart illustrating an exemplary method according to this invention.

FIG. 2 is a flowchart illustrating an exemplary embodiment of an automated document template creation method according to this invention. Beginning in step S1000, operation continues to step S1100, where data of an existing document is received. For example, image data of the existing document may be captured by scanning the existing document. Then, in step S1200, the image is segmented into objects and each object is classified by location and type as criteria for further partitioning of the object.

After segmentation and classification, each object is processed to extract object information in step S1300. Next, in step S1400, a determination is made whether the extracted object information warrants definition of one or more sub-objects defined by the classification criteria. For example, a text region may be sub-classified into a region containing red 10 point Anal font and another region containing black 16 point Times Roman font. If so, operation continues to step S1500 where one or more of the objects is partitioned into smaller objects or subobjects. Operation then returns to steps S1200–S1400 to process the subobjects.

If no definition of subobjects is warranted in step S1400, operation jumps to S1600, where the extracted object information is merged with the object location. Then, in step S1700, the merged data is used to build a template for the existing document. Once the template has been created, operation continues to step S1800, where the process ends.

While this invention has been described in conjunction with various exemplary embodiments, it is to be understood that many alternatives, modifications and variations would be apparent to those skilled in the art. Accordingly, Applicants intend to embrace all such alternatives, modifications and variations that follow in the spirit and scope of this invention.

For example, it should be understood that the configuration of the makeready station is illustrative and not limiting. The image capture device may be geographically separated from the processor of the makeready station. As noted above, the image capture device may be connected to the processor via any means of data transmission or image data from the image capture device could be conveyed via removable media, such as a diskette.

What is claimed is:

1. An automated document template creation method, comprising:
    inputting data of an existing document that contains a visual design to input an image;
    decomposing the image into at least one object using at least one image processing technique;
    determining at least one design attribute of the at least one object; and synthesizing a document template that contains the at least one design attribute.

2. The method of claim 1, wherein inputting data of the existing document comprises scanning the existing document.

3. The method of claim 1, wherein decomposing the image into at least one object comprises using an image segmentation technique.

4. The method of claim 1, wherein decomposing the image into at least one object comprises using an image classification technique, the at least one object being categorized by a location and a type.

5. The method of claim 4, wherein synthesizing a document further comprises:
determining whether the at least one object warrants further decomposition based on categorization by the location and the type; and
partitioning the at least one object into at least one subobject in response to further decomposition being determined.

6. The method of claim 5, wherein determining at least one design attribute of the at least object further includes determining at least one design subattribute of the at least one subobject.

7. The method of claim 1, wherein decomposing the image into at least one object comprises using an optical character recognition technique.

8. The method of claim 4, wherein synthesizing a document further comprises:
merging the location with information that is based on the at least one design attribute; and
building a template based on the at least one object.

9. The method of claim 1, wherein decomposing the image into at least one object comprises decomposing the image into at least one spatial characteristic.

10. The method of claim 9, wherein decomposing the image into at least one spatial characteristic comprises decomposing the image into at least one of text regions, pictorials and line art.

11. The method of claim 9, wherein decomposing the image into at least one object further comprises decomposing the image into at least one color theme.

12. The method of claim 1, wherein determining at least one design attribute of the at least one object comprises using an optical character recognition technique.

13. The method of claim 1, wherein determining at least one design attribute of the at least one object comprises determining a page layout.

14. The method of claim 1, wherein determining at least one design attribute of the at least one object comprises determining font information that includes at least one of font type, font size, paragraph spacing, line spacing, and justification.

15. An automated document template creation system, comprising:
an input device that receives data of an existing document containing a representative visual design to obtain an image;
an image processor that decomposes the image into at least one object and determines at least one design attribute of the at least one object; and
a template creator that synthesizes a document template containing the at least one design attribute.

16. The system of claim 15, wherein the input device comprises a scanner that scans the existing document.

17. The system of claim 15, further comprising a data storage device that stores the document template.

18. The system of claim 15, wherein the template creator synthesizes the document by merging the location with information that is based on the at least one design attribute.

19. The system of claim 15, wherein the image processor categorizes the at least one object by a location and a type, further determines whether the at least one object warrants definition into at least one subobject based on categorization by the location and the type, and successively partitions the at least one object into the at least one subobject.

20. The system of claim 15, wherein the at least one design attribute includes at least one of font type, font size, paragraph spacing, line spacing, and justification.

* * * * *